United States Patent [19]

Wideman et al.

[11] Patent Number: 5,726,248
[45] Date of Patent: Mar. 10, 1998

[54] POLYMERIC N-ARYL SUBSTITUTED AND N-ALKARYL SUBSTITUTED DIPHENYLDIAMINES

[75] Inventors: Lawson Gibson Wideman; Paul Harry Sandstrom, both of Tallmadge; Denise Jeannette Keith, Akron, all of Ohio

[73] Assignee: The Goodyear Tire & Rubber Company, Akron, Ohio

[21] Appl. No.: 787,368

[22] Filed: Jan. 22, 1997

Related U.S. Application Data

[63] Continuation of Ser. No. 697,122, Aug. 20, 1996, abandoned, which is a continuation of Ser. No. 303,920, Sep. 9, 1994, abandoned.

[51] Int. Cl.[6] .................................................. L08L 61/20
[52] U.S. Cl. ........................... 525/164; 525/64; 525/69; 525/98; 525/95; 525/157; 525/177; 525/391; 525/422
[58] Field of Search ........................... 525/164, 64, 69, 525/68, 45, 157, 177, 391, 392, 422

[56] References Cited

U.S. PATENT DOCUMENTS

| | | | |
|---|---|---|---|
| 5,049,625 | 9/1991 | Tazuma et al. | 525/391 |
| 5,280,071 | 1/1994 | Sturm et al. | 525/164 |

OTHER PUBLICATIONS

Miller et al., "Persistent Antioxidants", (1989) CA #112:140956 (ABS only).
Giurnica et al., "Oxidation in Presence Of Amines," (1982) CA #97:24977 (ABS only).

*Primary Examiner*—Frederick Krass
*Assistant Examiner*—Patrick R. Delaney
*Attorney, Agent, or Firm*—Bruce J. Hendricks

[57] ABSTRACT

This invention relates to a novel class of polymeric compositions which have molecular weights ranging from 300 to 10,000 and are the reaction product of (a) an N-aryl or N-alkaryl substituted diphenyldiamine and (b) a conjugated or nonconjugated diene. These polymeric N-aryl substituted and N-alkaryl diphenyldiamine compounds are particularly useful as an antioxidant in diene containing polymers.

11 Claims, No Drawings

POLYMERIC N-ARYL SUBSTITUTED AND N-ALKARYL SUBSTITUTED DIPHENYLDIAMINES

This is a continuation of application Ser. No. 08/697,122, filed on Aug. 20, 1996, now abandoned, which in turn is a continuation of application Ser. No. 08/303,920, filed on Sep. 9, 1994, now abandoned.

BACKGROUND OF THE INVENTION

As known to those skilled in the art, degradation of rubber from ozone manifests itself by (a) cracks appearing perpendicular to the stress in the rubber and (b) the appearance of a silvery film or frosting on the surface of the article. The attack of oxygen is purely a surface phenomenon. The function of the antioxidant depends on its migration to the surface of the rubber article where the battle against the oxygen attack can occur.

Conventional N-aryl substituted diphenyldiamine antioxidants, such as Wingstay® 100 are widely used in the protection of rubber. Wingstay® 100 is commercially available from The Goodyear Tire & Rubber Company and contains a mixture of di-o-tolyl-p-phenylenediamine, diphenyl-p-phenylene-diamine and phenyl-o-tolyl-p-phenylenediamine. Whereas use of these N-aryl substituted diphenyldiamine antioxidants have in the past proved quite satisfactory, recent developments in rubber technology has resulted in rubber products with extended service lives and, therefore, require commensurate protection from oxidation. These recent developments are particularly apparent in tires. Therefore, there exists a need for new and improved antioxidants offering extended protection from oxidation of rubber.

SUMMARY OF THE INVENTION

The present invention relates to polymeric antioxidant compositions and their use in a diene containing polymer. The polymeric antioxidant compositions have a molecular weight ranging from about 300 to about 10,000 and are derived from the polymerization reaction between (a) an N-substituted aryl or N-substituted alkaryl diphenyldiamine and (b) at least one conjugated or nonconjugated diene compound. The polymerization is conducted in the presence of an acid catalyst.

DETAILED DESCRIPTION OF THE INVENTION

The present invention relates to a polymeric composition useful as an antioxidant which comprises a polymer having a molecular weight ranging from about 300 to about 10,000 and is the polymeric reaction product of (a) an N-aryl substituted or N-alkaryl substituted diphenyldiamine of the formula:

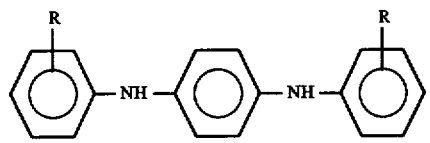

wherein each R is a radical selected from the group consisting of hydrogen and alkyls having from 1 to 8 carbon atoms;

(b) at least one diene selected from the group comprising
(1) conjugated dienes consisting of 1,3-butadiene, isoprene, chloroprene, 2-ethyl-1,3-butadiene, 2,3-dimethyl-1,3-butadiene, cyclopentadiene, piperylene; and (2) nonconjugated dienes consisting of 1,4-pentadiene, 1,4-hexadiene, ethylidane norbornene, 1,4-diisopropenylbenzene, 1,3-diisopropenylbenzene, 1,4-di-α-ethylvinylbenzene, 1,3-di-α-ethylvinylbenzene, 1-isopropenyl-4-α-ethylvinylbenzene, 1-isopropenyl-3-α-ethylvinylbenzene, 1-α-ethylvinyl-4-α'-isopropylvinylbenzene, 1-α-ethylvinyl-3-α'-isopropylvinylbenzene, 1,4-di-α-isopropylvinylbenzene, 1,3-di-α-isopropylvinylbenzene, limonene, vinylcyclohexene, cyclooctadiene, dicyclopentadiene and 1,5,9-cyclododecatriene.

There is also disclosed a composition comprising (1) a diene containing polymer and (2) a polymeric antioxidant having a molecular weight ranging from about 300 to about 10,000 and comprises the polymeric reaction product of (a) an N-aryl substituted or N-alkaryl substituted diphenyldiamine of the formula:

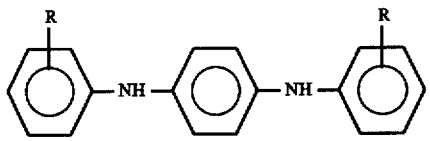

wherein each R is a radical selected from the group consisting of hydrogen and alkyls having from 1 to 8 carbon atoms;

(b) at least one diene selected from the group comprising
(1) conjugated dienes consisting of 1,3-butadiene, isoprene, chloroprene, cyclopentadiene, 2-ethyl-1,3-butadiene, 2,3-dimethyl-1,3-butadiene and piperylene; and (2) nonconjugated dienes consisting of 1,4-pentadiene, 1,4-hexadiene, ethylidene norbornene, 1,4-diisopropenylbenzene, 1,3-diisopropenylbenzene, 1,4-di-α-ethylvinylbenzene, 1,3-di-α-ethylvinylbenzene, 1-isopropenyl-4-α-ethylvinylbenzene, 1-isopropenyl-3-α-ethylvinylbenzene, 1-α-ethylvinyl-4-α'-isopropylvinylbenzene, 1-α-ethylvinyl-3-α'-isopropylvinylbenzene, 1,4-di-α-isopropylvinylbenzene, 1,3-di-α-isopropylvinylbenzene, limonene, vinylcyclohexene, cyclooctadiene, dicyclopentadiene and 1,5,9-cyclododecatriene.

As can be appreciated after having read the present application, by forming a polymeric N-aryl substituted or N-alkaryl substituted diphenyldiamine it is believed that the mobility of the N-aryl or N-alkaryl diphenyldiamine moiety to migrate to the surface of the host rubber is reduced and therefore a longer period of antioxidant availability is provided. In addition, by using a mixture of polymeric diphenyldiamines which vary in molecular weights, one provides a somewhat "time release" effect controlled by the difference of mobility of each polymeric antioxidant within the host polymer.

As mentioned above, an N-aryl or N-alkaryl substituted diphenyldiamine of the above formula is used to prepare the polymeric compositions of the present invention. With respect to the above formula, each R may consist of hydrogen or an alkyl having a total of from about 1 to about 8 carbon atoms. Each R, however, may be different from the other R substituent. Preferably, each R is hydrogen or an alkyl having 1 to 3 carbons. Representative of N-aryl substituted and N-alkaryl substituted diphenyldiamines which may be suitable for use in preparation of the compositions of the present invention include diphenyl-p-phenylenediamine, di-o-tolyl-p-phenylenediamine, phenyl-o-tolyl-p-phenylenediamine, di-o-xylyl-p-phenylenediamine, phenyl-o-xylyl-p-phenylenediamine, di-m-tolyl-p-phenylenediamine, phenyl-m-tolyl-p-phenylenediamine, di-m-xylyl-p-phenylenediamine, phenyl-m-xylyl-p-phenylenediamine, di-o-isopropylphenyl-p-phenylenediamine, phenyl-o-isopropylphenyl-p-phenylenediamine to name a few. The most preferred N-aryl substituted and N-alkaryl substituted diphenyldiamine is a mixture di-o-tolyl-p-phenylenediamine, diphenyl-p-phenylenediamine and phenyl-o-tolyl-p-phenylenediamine, known in the industry as Wingstay®100.

The polymeric compositions of the present invention are derived from at least one conjugated or nonconjugated diene. Examples of conjugated dienes which may be used include 1,3-butadiene, isoprene, chloroprene, 2-ethyl-1,3-butadiene, 2,3-dimethyl-1,3-butadiene, piperylene, cyclopentadiene or mixtures thereof. Examples of nonconjugated dienes which may be used include 1,4-pentadiene, 1,4-hexadiene, ethylidene norbornene, 1,4-diisopropenylbenzene, 1,3-diisopropenylbenzene, 1,4-di-α-ethylvinylbenzene, 1,3-di-α-ethylvinylbenzene, 1-isopropenyl-4-α-ethylvinylbenzene, 1-isopropenyl-3-α-ethylvinylbenzene, 1-α-ethylvinyl-4-α'-isopropylvinylbenzene, 1-α-ethylvinyl-3-α'-isopropylvinylbenzene, 1,4-di-α-isopropylvinylbenzene, 1,3-di-α-isopropylvinylbenzene, limonene, vinylcyclohexene, cyclooctadiene, dicyclopentadiene, 1,5,9-cyclododecatriene or mixtures thereof. In addition a mixture of conjugated and nonconjugated dienes may be used. The preferred dienes for use in preparation of the present invention are isoprene, piperylene, 1,4-diisopropenylbenzene and 1,3-diisopropenylbenzene.

The terms "polymeric compound" and "polymer" when used to describe the compositions of the present invention are intended to only include those molecules which contain a monomeric unit derived from the (1) N-aryl substituted or N-alkaryl substituted diphenyldiamine and (2) diene and where at least one of the monomeric units derived from the N-aryl or N-alkaryl substituted diphenyldiamine or diene is repeated. Therefore, the compounds formed by the reaction of a single N-aryl or N-alkaryl substituted diphenyldiamine molecule and a single diene molecule are not polymeric as the term is used herein. The term monomeric unit means a structure that occurs in a polymeric compound and which differs from the structure of N-aryl or N-alkaryl substituted diphenyldiamine or diene compound due to changes resulting from molecular reorientation during the linking to the adjacent structure. These changes may include addition to a double bond or the addition or removal of a hydrogen atom from the N-aryl or N-alkaryl substituted diphenyldiamine or diene.

The molar ratio of the N-aryl or N-alkaryl substituted diphenyldiamine to diene in the polymer may vary depending on the desired ratio in the final polymeric product. For example, the molar ratio of the N-aryl or N-alkaryl substituted diphenyldiamine to diene as starting material may range from about 1:10 to about 10:1. The preferred molar ratio of N-aryl or N-alkaryl substituted diphenyldiamine to diene may range from about 5:1 to 1:5 as starting material. The most preferred ratio ranges from about 2:1 to 1:2. As to the final product, the molar ratio of polymeric units derived from the N-aryl or N-alkaryl substituted diphenyldiamine to diene may range from about 8:1 to 1:8. The preferred molar ratio of N-aryl or N-alkaryl substituted diphenyldiamine to diene in the final product ranges from about 1:2 to 2:1 with a range of from about 1.1:1 to 1:1.1 being particularly preferred.

The polymerization reaction between the N-aryl or N-alkaryl substituted diphenyldiamine and the diene is conducted in the presence of an acid catalyst. Examples of acid catalysts that may be used include Bronsted acid and Lewis acid type catalysts. Such known acid catalysts include $H_2SO_4$, HCl, $H_3PO_4$; metal halides such as $BF_3$, $BCl_3$, $AlCl_3$, $AlBr_3$, $SnCl_4$, $ZnCl_2$, $SbCl_3$ and their etherares. The choice of a particular catalyst is dependent upon many factors including the melting or boiling points of the reactants, desired rate of reaction, solvent, and pressure and temperature limitations of the production equipment, etc. When higher yields are desired, the metal halides or their etherares may be utilized. The preferred acid catalysts are $BF_3$ and $AlCl_3$. The most preferred catalyst is $BF_3$ and its etherate.

The polymerization reaction may be carried out neat (without solvent) at or above the melting points of the reactants or can be carried out in the presence of a solvent. The solvent may be an aliphatic $C_6$–$C_{12}$ hydrocarbon, an aromatic or haloaromatic ($C_6$ to $C_9$) hydrocarbon, or a $C_6$ to $C_9$ aliphatic halohydrocarbon. Examples of suitable solvents are hexane, heptane, benzene, toluene, xylene and chlorobenzene. The preferred solvents are toluene and xylene.

The polymerization reaction may be conducted under a variety of operating conditions. The reaction pressure may vary and range from 1 atm to about 100 atm with a pressure of from about 2 atm to about 10 atm being preferred. The reaction temperature may range from about 25° to 220° C. with the preferred range being from about 140° to 190° C.

Depending on the reactivity of the reactants, amount of catalyst, reaction pressure and reaction temperature, the reaction time may vary. Generally speaking, the reaction time ranges from about 1 to about 8 hours.

In addition to the N-aryl or N-alkaryl substituted diphenyldiamine compound and diene, other compounds may be present during the polymerization reaction. For example, many feed streams containing the desired diene may also include other hydrocarbons. Examples of such hydrocarbons include 1,5-dimethyl-5-vinyl-1-cyclohexene, 1-methyl-4-isopropenyl-1-cyclohexene, 1,4-dimethyl-4-vinyl-1-cyclohexene, 1-methyl-5-isopropenyl-1-cyclohexene, 2,5-dimethyl-1,5-cyclooctadiene, 1,5-dimethyl-1,5-cyclooctadiene, 2-methyl-2-butene, butenes, pentenes and hexenes.

The reaction product of the polymerization reaction will generally include a mixture of compounds. These compounds may include simple arylated or alkarylated diphenyldiamines (not polymeric), and a variety of polymers with varying molecular weights.

The molecular weight of the polymeric compounds of the present invention may vary. For example, when the reactants are 1,3-butadiene and diphenyl-p-phenylenediamine, the molecular weight may be as low as 300. On the other hand, the molecular weight may be as high as 10,000. Preferably, the molecular weight ranges from about 330 to about 9,700 with a range of from about 500 to about 3,000 being particularly preferred. The above molecular weights are as determined by gel permeation chromatography.

Rubber stocks comprising diene containing polymers subject to oxidation may be protected with the compositions of the present invention. Examples of diene containing polymers include substituted and unsubstituted, saturated and unsaturated, natural and synthetic polymers. The natural polymers include natural rubber in its various forms, e.g., pale crepe and smoked sheet, and balata and gutta percha. The synthetic polymers include those prepared from a single monomer (homopolymer) or a mixture of two or more copolymerizable monomers (copolymer) wherein the monomers are combined in a random distribution or block form. The monomers may be substituted or unsubstituted and may possess one or more double bonds, for example, diene monomers, both conjugated and nonconjugated, and monoolefins including cyclic and acyclic monoolefins, especially vinyl and vinylidene monomers. Examples of conjugated dienes are 1,3-butadiene, isoprene, chloroprene, 2-ethyl-1,3-butadiene, 2,3-dimethyl-1,3-butadiene and piperylene. Examples of nonconjugated dienes are 1,4-pentadiene, 1,4-hexadiene, 1,5-hexadiene, dicyclopentadiene, 1,5-cyclooctadiene and ethylidene norbornene. Examples of acyclic monoolefins are ethylene, propylene, lobutene, isobutylene, 1-pentene and 1-hexene. Examples of cyclic monoolefins are cyclopentene, cyclohexene, cycloheptene, cyclooctene and 4-methylcyclooctene. Examples of vinyl monomers are styrene, acrylonitrile, acrylic acid, ethylacrylate, vinyl chloride, butylacrylate, methyl vinyl ether, vinyl acetate and vinyl pyridine. Examples of vinylidene monomers are $\alpha$-methylstyrene, methacrylic acid, methyl methacrylate, itaconic acid, ethyl methacrylate, glycidyl methacrylate and vinylidene chloride. Representative examples of the synthetic polymers used in the practice of this invention are polychloroprene; homopolymers of a conjugated 1,3-diene such as isoprene and butadiene, and in particular, polyisoprenes and polybutadienes having essentially all of their repeat units combined in a cis-1,4-structure; copolymers of a conjugated 1,3-diene such as isoprene and butadiene with up to 50 percent by weight of at least one copolymerizable monomer including ethylenically unsaturated monomers such as styrene or acrylonitrile; butyl rubber, which is a polymerization product of a major proportion of a monoolefin and a minor proportion of a diolefin such as butadiene or isoprene; polyurethanes containing carbon to carbon double bonds; and polymers and copolymers of monoolefins containing little or no unsaturation, such as polyethylene, polypropylene, ethylene propylene copolymers and terpolymers of ethylene, propylene and a nonconjugated diene such as dicyclopentadiene, 1,4-hexadiene and ethylidene norbornene. The rubber compounds preferably protected by this invention are cis-1,4-polyisoprene (natural or synthetic), polybutadiene, polychloroprene and the copolymers of isoprene and butadiene, copolymers of acrylonitrile and butadiene, copolymers of acrylonitrile and isoprene, copolymers of styrene and butadiene and blends thereof.

The amount of polymeric antioxidants that may be used in the diene containing polymers may vary and depend on the polymer to be protected, the particular polymeric antioxidant, desired protection and the like. Generally speaking, the polymeric antioxidant is used in amounts of from 0.1 to 10 parts per hundred parts (phr) of diene polymer. Preferably, the polymeric antioxidant is used in amounts of from about 1 to about 7 phr, with a range of from about 2 to about 5 phr being particularly preferred.

The polymeric antioxidants may be incorporated in the diene containing polymer by conventional mixing procedures, for example, by adding them in a Banbury mixer or by adding them to the rubber on a mill. With liquid or low melting solid polymeric antioxidants, no special precautions are necessary for obtaining good dispersions. However, when using higher melting polymeric antiozonants, it is recommended that they be ground to a fine powder, preferably 70 micrometer particle size or less to ensure adequate dispersion. Such powders may be treated to suppress dust, for example, by the addition of oil, or they can be mixed with a binder, for example, a polymer latex, and formed into granules or pellets containing up to 5 percent by weight of binder. They can also be formulated as predispersions or masterbatch in a diene polymer, which predispersions may contain, for example, from 15 to 50 percent by weight of polymer.

The diene rubber composition may contain conventional reinforcing agents and fillers. Representative of reinforcing agents include carbon black, which is typically added in amounts ranging from about 5 to 100 parts by weight based on 100 parts by weight of total rubber (phr). Preferably, carbon black is used in amounts ranging from about 15 to 85 phr. Typical carbon blacks that are used include N110, N121, N220, N231, N234, N242, N293, N299, N326, N330, M332, N339, N343, N347, N351, N358, N375, N472, N539, N550, N660, N683, N754 and N765. Depending on the particular use of the compound, the appropriate carbon black may be selected. Silica fillers may also be used. The silica filler that can be used include both pyrogenic and precipitated finely-divided silicas of the type heretofore employed for rubber compounding. The silica filler, however, is preferably of the type obtained by precipitation from a soluble silicate, such as sodium silicate. For example, silica fillers produced according to the method described in U.S. Pat. No. 2,940,830 can be used. These precipitated, hydrated silica pigments have a $SiO_2$ content of at least 50 percent and usually greater than 80 percent by weight on anhydrous basis. The silica filler may have an ultimate particle size in the range of from about 50 to 10,000 angstroms, preferably between 50 and 400 and, more preferably, between 100 and 300 angstroms. The silica may be expected to have an average ultimate particle size in a range of about 0.01 to 0.05 microns as determined by electron microscope, although the silica particles may even be smaller in size. The BET surface area of the filler as measured using nitrogen gas is preferably in the range of 40 to 600 square meters per gram, usually 50 to 300 square meters per gram. The BET method of measuring surface area is described in the *Journal of the American Chemical Society*, Vol. 60, page 304 (1930). The silica also has a dibutyl (DBP) absorption value in a range of about 200 to about 400, with a range of from about 220 to 300 being preferred.

Various commercially available silicas may be considered, for example only and with limitation, silicas commercially available from PPG Industries under the Hi-Sil trademark such as, for example, those with designations 210, 243, etc.; silicas available from Rhone-Poulenc, with designations of Z1165MP and Z165GR and silicas available from Degussa AG with designations VN2 and VN3, etc. The Rhone-Poulenc Z1165MP silica is a preferred silica which is reportedly characterized by having a BET surface area of about 160–170 and by a DBP value of about 250–290 and by having a substantially spherical shape.

The amount of silica filler used as the reinforcing filler can vary widely. Generally speaking, the amount may range between about 5 and about 85 parts by weight of siliceous pigment per 100 parts by weight of total rubber are used. More typically, between about 10 and 50 parts by weight of siliceous pigment per 100 parts of rubber are used.

The diene rubber composition may also contain conventional additives including peptizing agents, pigments, stearic acid, accelerators, sulfur vulcanizing agents, antiozonants, antioxidants, processing oils, activators, initiators, plasticizers, waxes, prevulcanization inhibitors, extender oils and the like. Representative of conventional accelerators are amines, guanidines, thioureas, thiols, thiurams, sulfenamides, dithiocarbamates and xanthates which are typically added in amounts of from about 0.2 to about 5 phr. Representative of sulfur vulcanizing agents include element sulfur (free sulfur) or sulfur donating vulcanizing agents, for example, an amine disulfide, polymeric polysulfide or sulfur olefin adducts. The amount of sulfur vulcanizing agent will vary depending on the type of rubber and particular type of sulfur vulcanizing agent but generally range from about 0.1 phr to about 5 phr with a range of from about 0.5 phr to about 2 phr being preferred. Representative of additional antidegradants which may be in the rubber composition include monophenols, bisphenols, thiobisphenols, polyphenols, hydroquinone derivatives, phosphites, phosphate blends, thioesters, naphthylamines, diphenol amines as well as other diaryl amine derivatives, para-phenylene diamines, quinolines and blended amines. Antidegradants are generally used in an amount ranging from about 0.1 phr to about 10 phr with a range of from about 2 to 6 phr being preferred. Representatives of a peptizing agent that may be used is pentachlorophenol which may be used in an amount ranging from about 0.1 phr to 0.4 phr with a range of from about 0.2 to 0.3 phr being preferred. Representative of processing oils which may be used in the rubber composition of the present invention include aliphatic-naphthenic aromatic resins, polyethylene glycol, petroleum oils, ester plasticizers, vulcanized vegetable oils, pine tar, phenolic resins, petroleum resins, polymeric esters and rosins. The processing oils may be used in a conventional amount ranging from about 0 to about 50 phr with a range of from about 5 to 35 phr being preferred. Representative of an initiator that may be used is stearic acid. Initiators are generally used in a conventional amount ranging from about 1 to 4 phr with a range of from about 2 to 3 phr being preferred.

Accelerators may be used in a conventional amount. In cases where only a primary accelerator is used, the amounts range from about 0.5 to 2.5 phr. In cases where combinations of two or more accelerators are used, the primary accelerator is generally used in amounts ranging from 0.5 to 2.0 phr and a secondary accelerator is used in amounts ranging from about 0.1 to 0.5 phr. Combinations of accelerators have been known to produce a synergistic effect. Suitable types of conventional accelerators are amines, disulfides, guanidines, thioureas, thiazoles, thiurams, sulfenamides, dithiocarbamates and xanthates. Preferably, the primary accelerator is a sulfenamide. If a secondary accelerator is used, it is preferably a guanidines, dithiocarbamate or thiuram compound.

The following examples are being presented for the purpose of illustrating the present invention.

EXAMPLE 1

Into a 1-liter 3-neck flask equipped with a thermometer, a heating mantle, reflux condenser and nitrogen balloon was charged 137 grams (0.50 mole) of a mixture of di-o-tolyl-p-phenylenediamine, diphenyl-p-phenylenediamine and phenyl-o-tolyl-p-phenylenediamine and 85 grams (0.538 mole) of 3-diisopropenylbenzene. The mixture was heated to about 120° C. to dissolve the components with occasional stirring. Ten ml (11.5 grams) of boron trifluoride etherate was added via syringe where an exotherm to about 240° C. was observed. The reaction pot was held at 240° C. for 5 minutes. The mixture was cooled to room temperature. The resulting solid product was crushed and washed with 5 percent aqueous NaOH solution and filtered. The product was dried at 120° C. in a vacuum oven to a constant weight. Analysis by GPC showed 5.1 percent by weight of the mixture had a molecular weight of 330, 2.1 percent by weight of the mixture had a molecular weight of 440, 7.2 percent by weight of the mixture had a molecular weight of 550, 9.4 percent by weight of the mixture had a molecular weight of 760, 8.3 percent by weight of the mixture had a molecular weight of 910, 11.8 percent by weight of the mixture had a molecular weight of 1140, 31.4 percent had a molecular weight of 1390, 22.7 percent had a molecular weight of 2920 and 1.0 percent had a molecular weight of 9640.

EXAMPLE 2

A reaction was carried out under the conditions of Example 1, except 274 grams (1.00 mole) of the N,N'-diaryl-p-phenylenediamine mixture of Example 1 allowed to react with 170 grams (1.076 mole) of 1,3-diisopropenylbenzene. The reaction mixture was heated to 120° C. to dissolve components with occasional stirring. The reaction mixture was cooled to room temperature before 20 ml (23.0 grams) of boron trifluoride etherate was added via syringe. A mild exotherm was observed as the reaction was heated to 240° C. for eight hours to give 341 grams of product after washing with 5 percent aqueous NaOH and drying. Analysis by GPC showed 13.4 percent by weight of the mixture had a molecular weight of 330, 3.7 percent by weight of the mixture had a molecular weight of 440, 8.3 percent by weight of the mixture had a molecular weight of 550, 11.0 percent by weight of the mixture had a molecular weight of 760, 7.8 percent by weight of the mixture had a molecular weight of 910 and 9.7 percent by weight of the mixture had a molecular weight of 1140, 23.1 had a molecular weight of 1390, 15.1 percent had a molecular weight of 2920 and 1.8 percent had a molecular weight of 9640.

EXAMPLE 3

Rubber compositions according to the recipe in Table I below were prepared in a BR Banbury® using two separate stages of addition. The sulfur and accelerator were added to the Banbury in the second stage, whereas the processing aids were added to the first pass along with the rubbers and carbon black. Different amounts of commercially available antioxidants or the product of Example 1 were added during the first stage of mixing. Table II sets out the vulcanizate properties of the rubber compounds. The only difference in composition of the rubber compounds is indicated in the tables.

TABLE I

| Material | Weight Parts |
|---|---|
| Natural Rubber | 50.00 |
| BUD 1207 ®[1] | 50.00 |
| Carbon black | 45.00 |
| Santoflex 13[2] | Varied |
| Agerite Resin D[3] | Varied |
| Wingstay 100[4] | Varied |
| Polymeric Antioxidant of Ex. 1 | Varied |
| Fatty Acid | 1.00 |
| Wax | 1.50 |
| Zinc Oxide | 5.00 |
| Sulfur/Accelerator | 2.72 |

[1]A high cis-1,4-polybutadiene rubber commercially available from The Goodyear Tire & Rubber Company.
[2]N-1,3-Dimethylbutyl-N'-phenyl-p-phenylenediamine from Monsanto.
[3]Polymerized 2,2,4-trimethyl-1,2-dihydroquinoline from Vanderbilt.
[4]Mixed diaryl-p-phenylenediamines with various levels of methyl group substitution on the rings.

TABLE II

| Example | (1) | (2) | (3) | (4) |
|---|---|---|---|---|
| Properties | | | | |
| Santoflex 13 | 3.5 | 5.0 | 3.5 | 5.0 |
| Wingstay 100 | 1.0 | 1.75 | 0 | 0 |
| Agerite Resin D | 2.0 | 2.0 | 0 | 0 |
| Polymeric AO | 0 | 0 | 1.0 | 1.75 |
| Max Torque | 37.8 | 36.3 | 39.5 | 38.3 |
| Min Torque | 8.7 | 8.3 | 9.1 | 8.6 |
| T90 | 18.2 | 16.6 | 19.7 | 17.8 |
| T25 | 11.4 | 10.2 | 12.2 | 10.8 |
| TS | 17.0 | 16.3 | 16.8 | 16.4 |
| EB | 568 | 581 | 535 | 552 |
| M300 | 7.5 | 6.8 | 8.2 | 7.6 |
| Rebound, RT | 58.0 | 57.2 | 59.0 | 58.0 |
| Rebound, Hot | 63.8 | 64.1 | 65.3 | 65.7 |
| Hardness, RT | 56.4 | 55.0 | 57.3 | 57.1 |
| Hardness, Hot | 51.1 | 49.6 | 52.7 | 51.9 |
| Strebler | 84 | 90 | 77 | 84 |
| Rheovibron, 11 Hz | | | | |
| E' @ 60° C., MPa | 8.72 | 8.95 | 10.2 | 10.4 |
| Tan delta | .095 | .099 | .090 | .093 |
| Static Ozone* | | | | |
| Lower, Orig | D3 | D3 | D3 | D3 |
| Upper | B3 | A1 | C3 | A1 |
| Lower, Aged*** | D3 | C2 | D3 | A1 |
| Upper | B3 | A1 | B3 | 0 |
| Dynamic* | | | | |
| Original | Edge | Edge | Edge | Edge |
| Aged | Edge | Edge | Edge | Edge |
| Cyclic Ozone (Original)** | | | | |
| 4 days | 0 | 0 | 0 | 0 |
| 6 days | 1/2-0 | 1/2-0 | 1/2-0 | 1/2-0 |
| 10 days | 1/2-0 | 1/2-0 | 1/2-0 | 1/2-0 |
| 14 days | 4-2 | 1-0 | 4-2 | 1-0 |
| 17 days | 4-5 | 3-1 | B | 3-1 |
| 19 days | B | B | B | B |
| Cyclic Ozone (Aged)** | | | | |
| 4 days | 0 | 0 | 0 | 0 |
| 6 days | 0 | 0 | 0 | 0 |
| 10 days | 1/2-0 | 1/2-0 | 1/2-0 | 1/2-0 |
| 14 days | 1/2-0 | 1/2-0 | 1/2-0 | 1/2-0 |
| 17 days | 1-0 | 1-0 | 1-0 | 1-0 |
| 19 days | 2-1 | 2-1 | 2-1 | 2-1 |

\*
0 = no cracking
F = complete failure

Number of Cracks
A = very few (less than 1/4 surface)
B = few (1/4 to 1/2 surface)
C = moderate (1/2 to 3/4 surface)
D = heavy (3/4 to all surface)

Size of Cracks
1 = small (hairline)
2 = medium
3 = large
4 = severe (open)

\*\*
Density
0 = none
= Edge
1 = 1/8 surface
2 = 3/8 surface
3 = 5/8 surface
4 = 3/4 surface
= Broke (failure)

Severity
0 = none
1 = .01 inch
3 = .03 inch
5 = .10 inch
10 = .25 inch
12 = +.25 inch \*\*\*aged seven days in an air oven at 70° C.

The polymeric diphenyldiamine (Examples 3 and 4) gave cured properties similar to the Santoflex 13 (Examples 1 and 2) with some improvement shown in modulus (300 percent modulus and Rheovibron E') and rebound properties. The polymeric product also gave ozone resistance equivalent to the monomeric product. Equivalent performance in cured properties and an expected significant lowering of volatility and long-term persistence makes these types of materials very attractive when considering environmental effects.

What is claimed is:

1. A polymeric composition useful as an antioxidant which comprises a polymer having a molecular weight ranging from about 300 to about 3,000 and consists of the polymeric reaction product of (a) an N-aryl or N-alkaryl substituted diphenyldiamine of the formula:

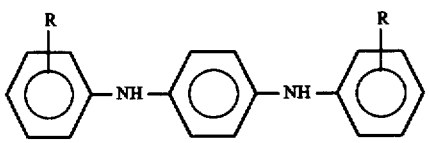

wherein each R may be the same or different and is a radical selected from the group consisting of hydrogen and alkyls having from 1 to 8 carbon atoms; and (b) at least one diene selected from the group consisting of (1) conjugated dienes consisting of 1,3-butadiene, isoprene, chloroprene, 2-ethyl-1,3-butadiene, 2,3-dimethyl-1,3-butadiene and piperylene; and (2) nonconjugated dienes consisting of 1,4-pentadiene, 1,4-hexadiene, ethylidene norbornene, 1,4-diisopropenylbenzene, 1,3-diisopropenylbenzene, 1,4-di-α-ethylvinylbenzene, 1,3-di-α-ethylvinylbenzene, 1-isopropenyl-4-α-ethylvinylbenzene, 1-isopropenyl-3-α-ethylvinylbenzene, 1-α-ethylvinyl-4-α'-isopropylvinylbenzene, 1-α-ethylvinyl-3-α'-isopropylvinylbenzene, 1,4-di-αisopropylvinylbenzene, 1,3-di-α-isopropylvinylbenzene limonene vinylcyclohexene, cyclooctadiene, dicyclopentadiene 1,5,9-cyclododecatriene and mixtures thereof; and wherein the molar ratio of polymer units derived from diphenyldiamine to diene ranges from about 2:1 to 1:2.

2. The polymeric composition of claim 1 wherein R is selected from the group consisting of hydrogen and alkyls having from about 1 to about 3 carbon atoms and the diene is selected from the group consisting of 1,4-diisopropenylbenzene, 1,3-diisopropenylbenzene and isoprene.

3. The polymeric composition of claim 1 having an average molecular weight of from about 500 to about 3000.

4. The polymeric composition of claim 1 wherein said diphenyldiamine and said diene are reacted in the presence of an acid catalyst.

5. The polymeric composition of claim 1 wherein said acid catalyst is a Bronsted acid or Lewis acid.

6. The polymeric composition of claim 5 wherein said acid catalyst is $H_2SO_4$, HCl, $H_3PO_4$, $HClO_4$, $BF_3$, $BCl_3$, $AlCl_3$, $AlBr_3$, $SnCl_4$, $ZnCl_2$, $SbCl_3$ and etherates of said acid catalysts.

7. The polymeric composition of claim 6 wherein said acid catalyst is BF3 and BF3 etherate.

8. A composition comprising (1) a diene containing polymer and (2) a polymeric antioxidant having a molecular weight ranging from about 300 to 3,000 and consists of the polymeric reaction product of (a) an N-aryl substituted or N-alkaryl substituted diphenyldiamine of the formula:

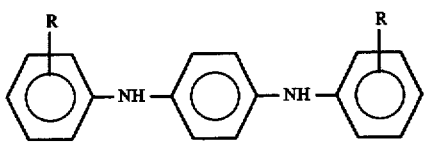

wherein each R may be the same or different and is a radical selected from the group consisting of hydrogen and alkyls having from 1 to 8 carbon atoms;

(b) at least one diene selected from the group consisting of (1) conjugated dienes consisting of 1,3-butadiene, isoprene, chloroprene, 2-ethyl-1,3-butadiene, 2,3-dimethyl-1,3-butadiene and piperylene; and (2) non-conjugated dienes consisting of 1,4-pentadiene, 1,4-hexadiene, ethylidene norbornene, 1,4-diisopropenylbenzene, 1,3-diisopropenylbenzene, 1,4-di-α-ethylvinylbenzene, 1,3-di-α-ethylvinylbenzene, 1-isopropenyl-4-α-ethylvinylbenzene, 1-isopropenyl-3-α-ethylvinylbenzene, 1-α-ethylvinyl-4-α'-isopropylvinylbenzene, 1-α-ethylvinyl-3-α'-isopropylvinylbenzene, 1,4-di-α-isopropylvinylbenzene, 1,3-di-α-isopropylvinylbenzene, limonene, vinylcyclohexene, cyclooctadiene, dicyclopentadiene 1,5,9-cyclooctatriene and mixtures thereof; and wherein the molar ratio of polymer units derived from diphenyldiamine to diene ranges from about 2:1 to 1:2.

9. The composition of claim 8 wherein said diene containing polymer is selected from the group comprising natural rubber, polyisoprene, polybutadiene, polychloroprene, copolymers of isoprene and butadiene, copolymers of styrene and butadiene, copolymers of acrylonitrile and butadiene, copolymers of acrylonitrile and isoprene and blends thereof.

10. The composition of claim 9 wherein said polymeric antioxidant is present in an amount ranging from about 0.1 to 10 parts per hundred parts of diene polymer.

11. The composition of claim 9 wherein said polymeric antioxidant is present in an amount ranging from about 1 to about 7 parts per hundred parts of diene polymer.

* * * * *